W. KAVAN.
ROTARY BARBER'S POLE.
APPLICATION FILED SEPT. 7, 1920.
1,366,668.
Patented Jan. 25, 1921.
2 SHEETS—SHEET 1.
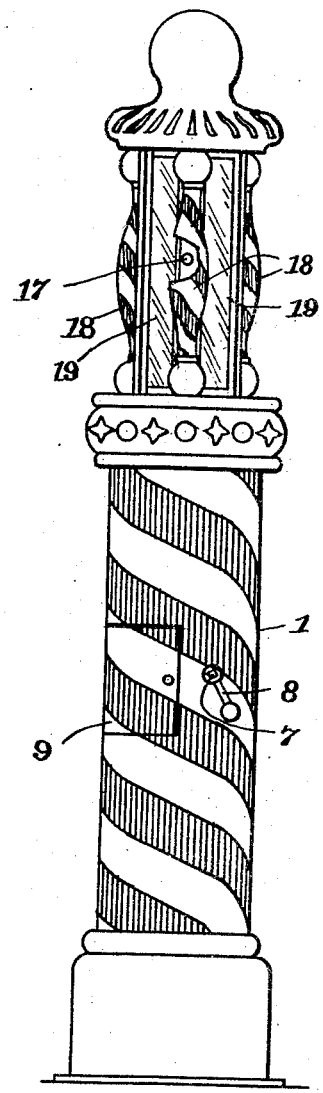
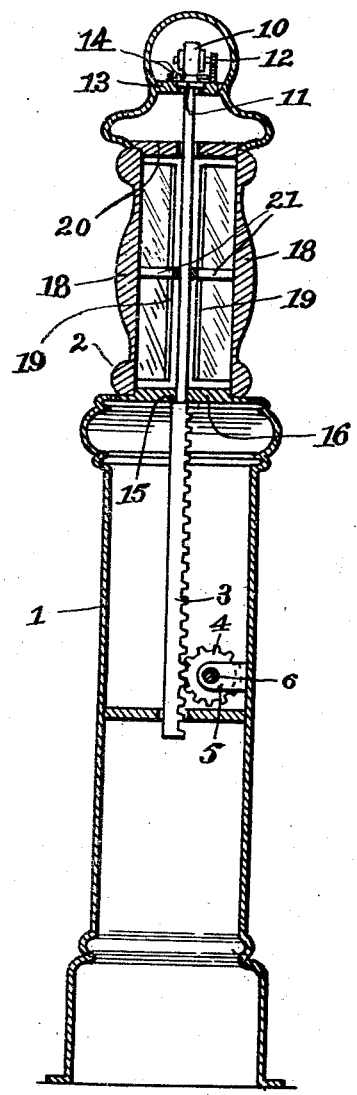
Inventor:
Wladimir Kavan,
By Frederick V. Winters
Attorney.

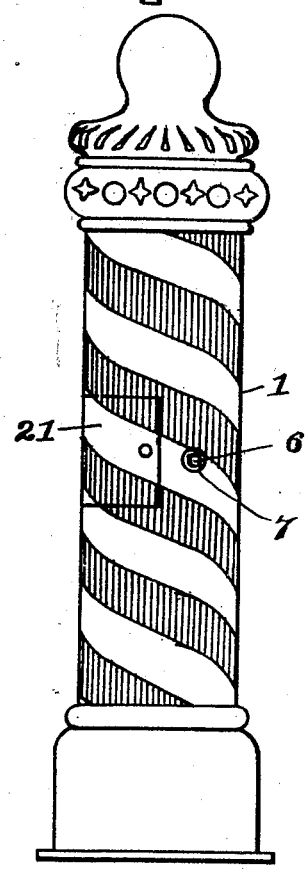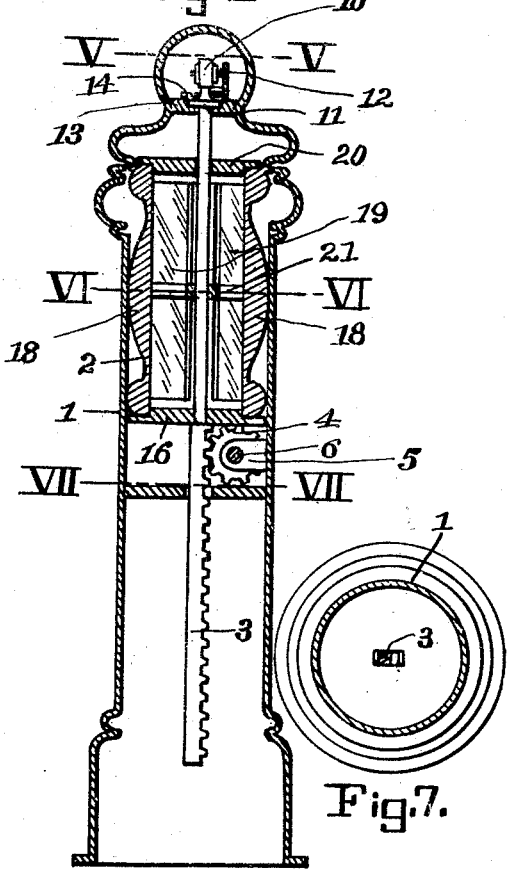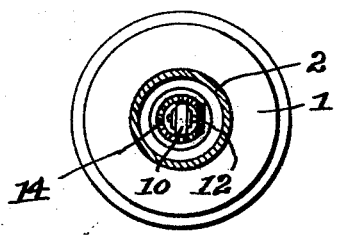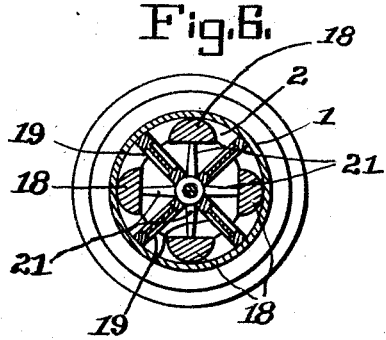

UNITED STATES PATENT OFFICE.

WLADIMIR KAVAN, OF NEW YORK, N. Y.

ROTARY BARBER'S POLE.

1,366,668.   Specification of Letters Patent.   Patented Jan. 25, 1921.

Application filed September 7, 1920. Serial No. 408,419.

*To all whom it may concern:*

Be it known that I, WLADIMIR KAVAN, a citizen of Moravia, residing at New York, in the county and State of New York, have invented certain new and useful Improvements in Rotary Barbers' Poles, of which the following is a full, clear, and exact specification.

This invention relates to barbers' poles, and has for its object to provide a pole having a revolving portion which may be inclosed when not in use, so that it will be protected from the weather and injury by meddlesome persons.

Another object is to provide means on the revolving portion of the pole for displaying advertisements. A further object is to provide means for manually raising and lowering said revolving portion of the pole for extending or withdrawing the same, said revolving portion being bodily movable so as to be telescoped into a main stationary portion of the pole. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is an elevation of a barber's pole constructed substantially in accordance with this invention and showing the telescopic revolving portion projected or raised, as when in use.

Fig. 2 is a central vertical section of the pole as shown in Fig. 1.

Fig. 3 is an elevation of the pole showing how it appears when the revolving portion is collapsed or withdrawn into the lower stationary portion.

Fig. 4 is a central vertical section of the pole as shown in Fig. 3.

Fig. 5 is a section on the line V—V of Fig. 4.

Fig. 6 is a section on the line VI—VI of the same figure, and

Fig. 7 is a section on the line VII—VII of Fig. 4.

The pole consists of a lower stationary portion 1 of hollow formation, and a telescoping upper portion 2 adapted to be lowered into the upper end portion of said stationary part, as illustrated in Figs. 3 and 4, or projected or raised so as to project therefrom as shown in Figs. 1 and 2. Said telescopic portion or section 2 of the pole may be raised or lowered manually by means of a rack bar 3 depending from said movable section in the center of the stationary section and meshing with a gear 4 journaled at 5 in the interior of said stationary section. The shaft 6 on which said gear is fixed extends through the wall of the stationary section 1 and is formed with an angular socket 7 in its end, as shown in Fig. 3, to receive a crank 8 illustrated in Fig. 1 whereby said gear may be rotated for moving the rack and telescopic section of the pole vertically with respect to the main or stationary section. Access may be had to the interior of the main portion of the pole through a door 9, Figs. 1 and 3, for the purpose of making repairs or adjustments.

The upper telescopic section of the pole may be revolved by means of an electric motor 10 arranged inside of the upper end portion thereof, said motor being supported stationary on the upper end of an integral extension 11 of the rack bar 3 and geared at 12 to a horizontal partition 13 in said upper end portion of the telescopic section as at 14, Figs. 2, 4 and 5. The extension 11 of the rack bar 3 is stepped at 15 for supporting the telescopic part of the pole by means of a horizontal partition 16 fitting loosely around the extension and resting upon said step 15. Any other suitable means for revolubly supporting the telescopic section so that it may be raised and lowered bodily may, however, be employed instead of the means illustrated. The electric circuit for the motor is not illustrated but may be arranged in any suitable manner and controlled by a push-button placed at some out of the way place, as at 17 in Fig. 1.

As shown best in Figs. 1 and 6, the revoluble telescopic portion of the pole may be equipped with a plurality of small poles 18 of desired fancy design, and between said small poles 18 there may be arranged frames 19 for holding advertisements. These frames 19 are preferably arranged radially of the revolving section and extend between the small poles which are placed in the angles between said frames where they are supported or held securely by the partition 16 at the bottom, another partition or spider 20 at the top and radiating arms 21 in the center, if desired.

When the pole is in use, the telescopic upper section 2 is raised to the position shown in Figs. 1 and 2 by means of the crank 8 which is inserted into the socket 7 for that purpose. The motor is then started by pressing the push-button 17 and the projecting portion or section 2 thus caused to slowly revolve. When the shop is closed, the motor is stopped and the revoluble section 2 lowered into the main section 1 of the pole by again inserting the crank into the socket and turning the same in the proper direction until said section 2 has been dropped to the position shown in Figs. 3 and 4, after which the crank is removed and the revoluble part of the pole left housed and protected within the stationary part until it is time to open the shop again.

Having thus described my invention, what I claim as new and desire to secure by Letters Patent of the United States is:—

1. In a barber's pole, the combination with a stationary portion having a cavity therein, of a movable portion adapted to be housed in the cavity in the stationary portion, and mechanical means for projecting and withdrawing said movable member.

2. In a barber's pole, the combination with a stationary portion having a cavity therein, of a movable portion adapted to be housed in said cavity, a rack bar attached to said movable portion, and a gear mounted on the stationary portion and meshing with said rack bar for raising and lowering said movable member.

3. In a barber's pole, the combination with a stationary portion having a cavity therein, of a movable portion adapted to be housed in said cavity, and means for projecting said movable portion from said cavity and for retracting it into said cavity.

4. In a barber's pole, the combination with a stationary portion having a cavity therein, of a movable portion adapted to be housed in said cavity, a rack bar attached to said movable portion, a gear mounted in the stationary portion and meshing with said rack bar, and a crank detachably connected to said gear for raising and lowering the movable member.

5. In a barber's pole, the combination with a stationary portion having a cavity therein, of a movable portion adapted to be housed in said cavity, means for projecting said movable member from said cavity and for retracting the same into said cavity, and means for rotating said movable portion.

6. In a barber's pole, the combination with a stationary portion, of a revoluble portion, and a plurality of frames arranged radially on said revoluble portion and adapted for the display of advertisements on both sides of each of said frames.

7. In a barber's pole, the combination with a stationary portion, of a revoluble portion, a stationary support in said revoluble portion, a motor mounted on said support, and driving means from said motor to the revoluble portion.

8. In a barber's pole, the combination with a stationary portion, of a revoluble portion having a dome at its upper end, a stationary support in said dome, a motor supported on said support, and driving means from said motor to said revoluble member.

9. In a barber's pole, the combination with a stationary portion, of a revoluble portion having a dome at its upper end, a stationary support extending from the stationary portion of the pole up through said revoluble portion, a motor mounted on said support in said dome, and driving means from said motor to the revoluble portion of the pole.

10. In a barber's pole, the combination with a stationary member having a cavity therein, of a revoluble member adapted to be housed in said cavity and projected therefrom, a non-rotatable rack bar for raising and lowering said revoluble member, a motor mounted on said rack bar, and driving means from said motor to the revoluble member.

In testimony whereof I have signed my name to this specification.

WLADIMIR KAVAN.